United States Patent
Goldberg

(10) Patent No.: US 9,623,917 B2
(45) Date of Patent: Apr. 18, 2017

(54) EXTRUDED AIRDAM FOR REDUCING THE LIFT AND DRAG OF A MOTOR VEHICLE

(71) Applicant: FORD GLOBAL TECHNOLOGIES, LLC, Dearborn, MI (US)

(72) Inventor: Ira Jason Goldberg, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/643,025

(22) Filed: Mar. 10, 2015

(65) Prior Publication Data

US 2016/0264194 A1    Sep. 15, 2016

(51) Int. Cl.
    *B62D 35/00* (2006.01)
    *B62D 35/02* (2006.01)

(52) U.S. Cl.
    CPC ........... *B62D 35/02* (2013.01); *B62D 35/005* (2013.01)

(58) Field of Classification Search
    CPC ....... B62D 35/02; B62D 35/005; B62D 37/02
    USPC .............. 296/180.1, 187.04, 181.5; 180/903
    See application file for complete search history.

(56) References Cited

U.S. PATENT DOCUMENTS

| | | | | |
|---|---|---|---|---|
| 3,884,516 A | * | 5/1975 | Gallion | B60R 19/18 293/117 |
| 4,131,308 A | * | 12/1978 | Holka | B62D 35/005 296/180.5 |
| 4,976,489 A | * | 12/1990 | Lovelace | B62D 35/005 296/180.1 |
| 6,513,843 B1 | * | 2/2003 | Frederick | B60R 19/18 293/120 |
| 8,356,856 B2 | | 1/2013 | Danev | |
| 8,827,333 B2 | | 9/2014 | Ota et al. | |
| 8,998,292 B2 | * | 4/2015 | Beedle | B62D 35/001 180/903 |
| 2003/0116996 A1 | * | 6/2003 | Soja | B62D 35/005 296/180.5 |
| 2009/0051183 A1 | * | 2/2009 | Mourou | B60R 13/04 296/1.08 |
| 2009/0230714 A1 | * | 9/2009 | Reese | B60J 1/06 296/92 |
| 2012/0292943 A1 | * | 11/2012 | Danev | B62D 35/005 296/180.1 |
| 2015/0225026 A1 | * | 8/2015 | Ohira | B62D 25/08 296/180.1 |

FOREIGN PATENT DOCUMENTS

| | | | | |
|---|---|---|---|---|
| DE | 3218670 A1 | | 11/1983 | |
| DE | 3525627 A1 | * | 3/1986 | .......... B62D 35/005 |
| EP | 2199189 A1 | | 6/2010 | |
| JP | H06298129 A | | 10/1994 | |
| JP | 5569338 B2 | | 8/2014 | |

OTHER PUBLICATIONS

English machine translation of 2199189EP.
English machine translation of 5569338JP.
English machine translation of H06298129JP.
English machine translation of 3218670DE.

\* cited by examiner

*Primary Examiner* — Jason S Morrow
(74) *Attorney, Agent, or Firm* — Jason Rogers; King & Schickli, PLLC

(57) ABSTRACT

An airdam is provided for a motor vehicle. The airdam includes an extruded body having a J-shaped cross-section defining a forward tilt angle and a curved lip. The body may include a crescent shaped profile or a bell curve shaped profile.

14 Claims, 7 Drawing Sheets

EXTRUDED AIRDAM FOR REDUCING THE LIFT AND DRAG OF A MOTOR VEHICLE

TECHNICAL FIELD

This document relates generally to the motor vehicle field and, more specifically, to an airdam that improves the aerodynamic performance of the motor vehicle.

BACKGROUND

It has long been known to equip a motor vehicle with an airdam to reduce lift and drag and improve the aerodynamic properties of the motor vehicle. The lower to the ground the airdam reaches, the greater the improvement to lift and drag coefficients. The problem is to develop an airdam that can be as low to the ground as possible while also not becoming damaged during everyday use from contact with driveway ramps, parking curbs or other roadway and parking obstacles.

This document relates to airdam embodiments made from a relatively soft rubber material that will deflect or bend when contacted by the ground or other objects so as to allow contact without structural damage. Further, the airdam embodiments are designed with a forward tilt angle allowing the airdam to maintain effectiveness even as it is forced to deflect rearwardly by wind forces as vehicle speeds increase.

SUMMARY

In accordance with the purposes and benefits described herein, an airdam is provided for a motor vehicle. The airdam may be broadly described as comprising an extruded body having a J-shaped cross-section defining a forward tilt angle and a curved lip.

In one possible embodiment, the airdam body is co-extruded with a first section of the body above the forward tilt angle made from a first material of a first durometer $D_1$ and a second section of the body below the forward tilt angle made from a second material with a second durometer $D_2$ where $D_1 > D_2$. Thus, the upper section of the body is made from a material that is harder than the lower section of the body.

In one possible embodiment, the first material durometer $D_1$ is about 40 Shore D to about 65 Shore D and the second material durometer $D_2$ is about 55 Shore A to about 80 Shore A. In one particularly useful embodiment, the first material durometer $D_1$ is about 50 Shore D and the second material durometer $D_2$ to about 64 Shore A.

In one possible embodiment, the forward tilt angle defined by the airdam body is between about 10° and about 30°. In one particularly useful embodiment, the forward tilt angle is about 20°.

In one useful embodiment, the curved lip is curved forward toward a forward face of the airdam and the front of the motor vehicle. In one particularly useful embodiment, the body has a crescent shaped profile. Further, the first section is provided with a mounting base for securing to the frame of the motor vehicle.

In yet another useful embodiment, the airdam body has a bell curve shaped profile. The J-shaped cross-section of the body with bell curve shaped profile defines a forward tilt angle of between about 10° and about 30° and in one particularly useful embodiment, an angle of about 20°. Further, the curved lip at the distal end of the body is curved forward so as to assume a more vertical orientation as the airdam is deflected by the force of the wind at higher motor vehicle speeds.

In the following description, there are shown and described several preferred embodiments of the airdam. As it should be realized, the airdam is capable of other, different embodiments and its several details are capable of modification in various, obvious aspects all without departing from the airdam as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the airdam and together with the description serve to explain certain principles thereof. In the drawing figures.

Reference will now be made in detail to the present preferred embodiments of the airdam, examples of which are illustrated in the accompanying drawing figures.

DETAILED DESCRIPTION

Figure 1:
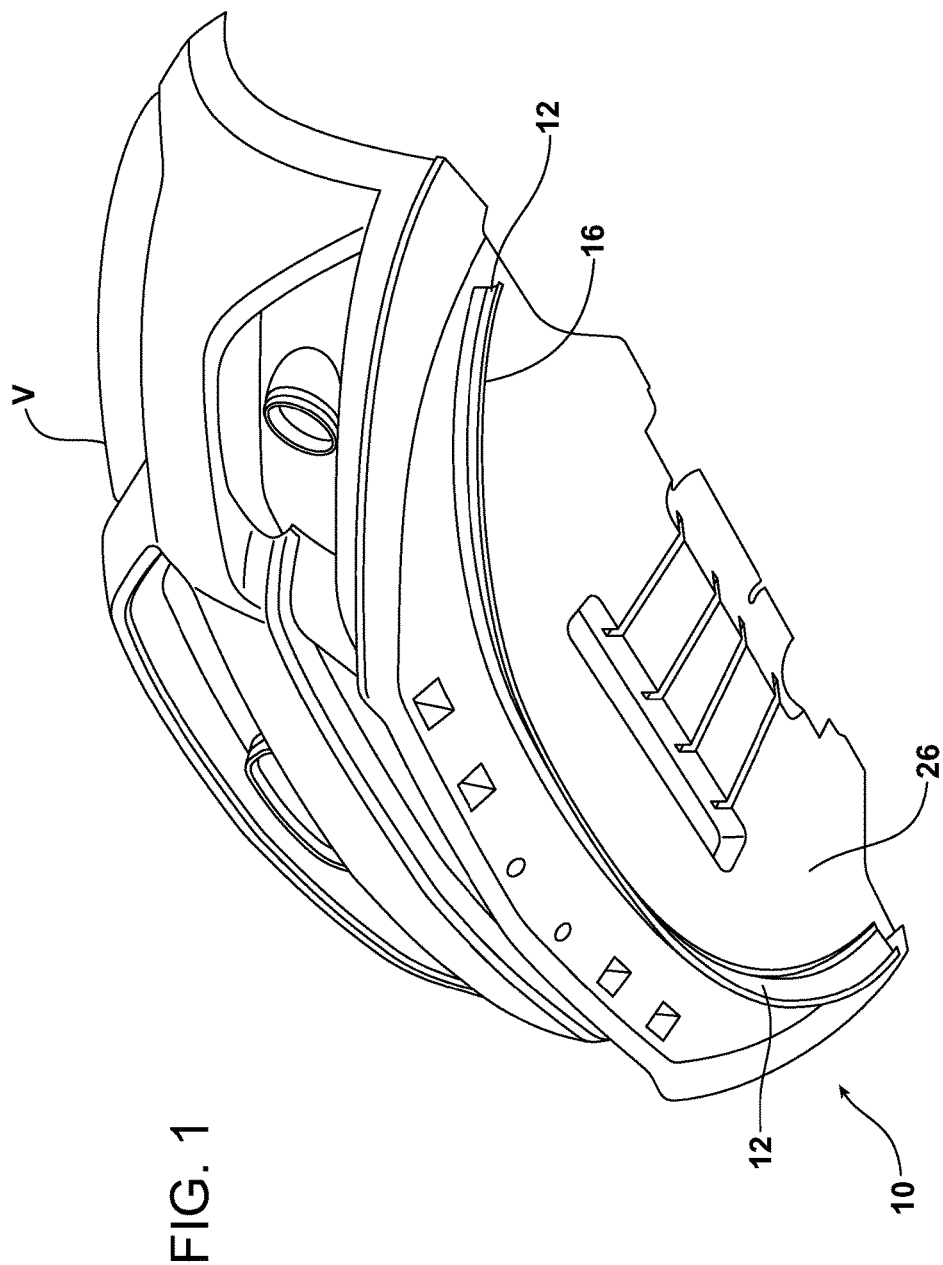
FIG. 1 is a perspective view from below illustrating a first embodiment of airdam with a crescent shaped profile.
Figure 2:
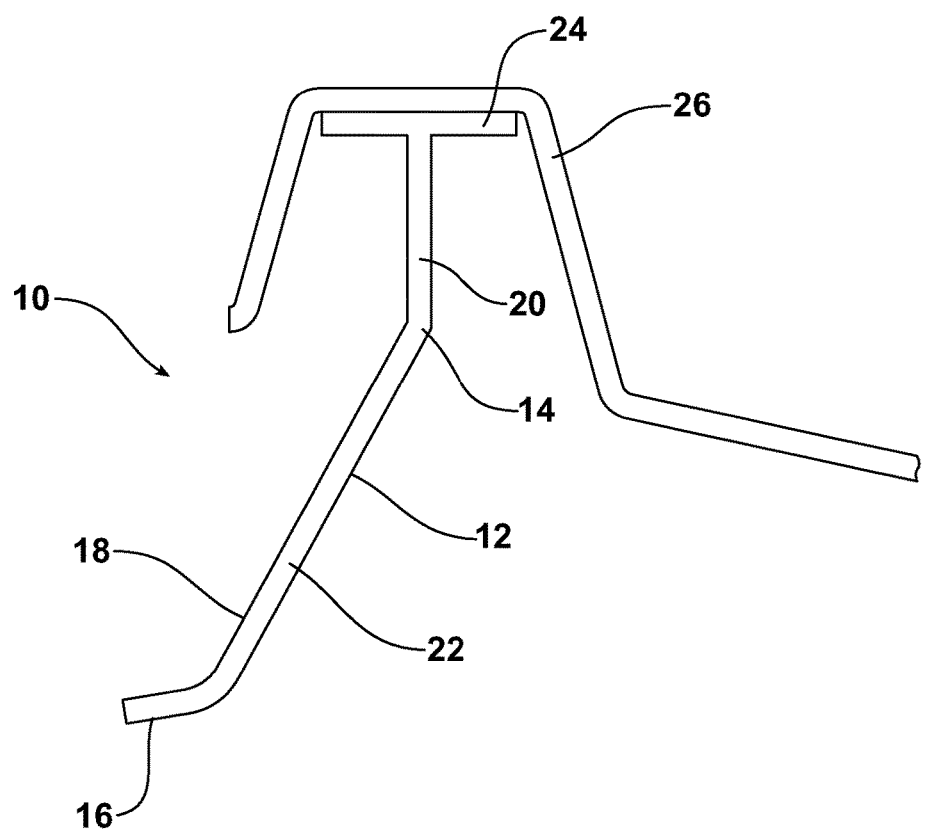
FIG. 2 is a cross-section of the airdam illustrated in FIG. 1.

Reference is now made to FIGS. 1 and 2 illustrating a first embodiment of an airdam 10. The airdam 10 includes an extruded body 12 having a J-shaped cross-section defining a forward tilt angle 14 and a curved lip 16. In one possible embodiment, the forward tilt angle 14 is between about 10° and about 30°. Thus, the forward face 18 of the body 12 defines an included angle of between 150° and 170°. In one particularly useful embodiment, the forward tilt angle is about 20°. In this embodiment, the forward face 18 defines an included angle of approximately 160°. In any of these embodiments, the curved lip 16 is curved forward or toward the forward face 18 and the front of the motor vehicle V to which the airdam 10 is secured.

In one particularly useful embodiment, the body 12 is co-extruded with a first section 20 of the body above the forward tilt angle 14 made from a first material having a first durometer $D_1$ and the second section 22 of the body below the forward tilt angle 14 made from a second material with a second durometer $D_2$ where $D_1 > D_2$. Thus, the first or uppermost section 20 of the body 12 is made from a harder material than the second or lowermost section 22. Materials useful in the construction of the airdam 10 via the coextrusion process include, but are not limited to thermoplastic elastomer, plastic, rubber and combinations thereof.

In one possible embodiment, the first material durometer $D_1$ is about 40 Shore D to about 65 Shore D and the second material durometer $D_2$ is about 55 Shore A to about 80 Shore A. In another particularly useful embodiment, the first material durometer $D_1$ is about 50 Shore D and the second material durometer $D_2$ is about 64 Shore A. As illustrated in FIG. 2, the first or upper section 20 may incorporate a mounting base 24 that is secured by fasteners (not shown) to the forward belly pan 26 of the motor vehicle.

As should be appreciated, the second or lower section 22 of the airdam 10 is made from a relatively soft material that readily deflects upon approach angle contact with the ground such as on a driveway ramp or even with a parking curb. This deflection is made without producing any objectionable sound and functions to prevent any structural damage to the airdam 10. At the same time, the first or upper section 20 is made of a harder material to enhance the strength of the airdam 10 and the integrity of the connection between the airdam and the belly pan 26 of the motor vehicle V.

Figure 3A:
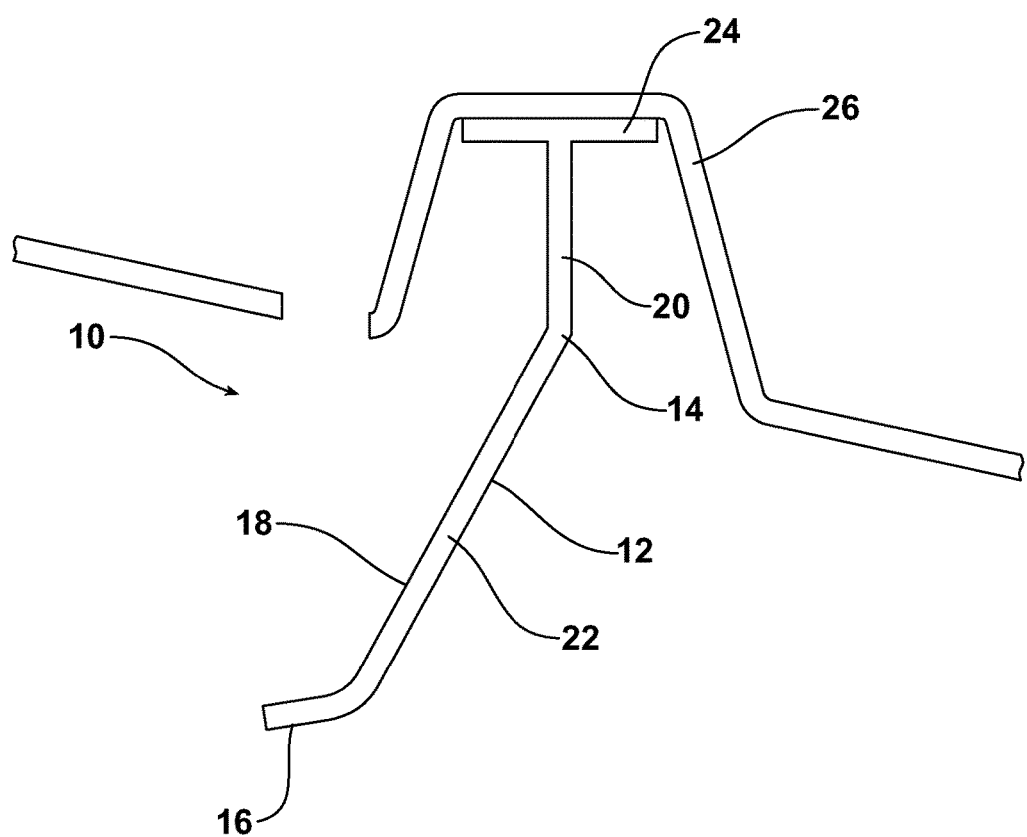
FIGS. 3a-3c are cross-sectional views of the crescent shaped airdam illustrated in FIGS. 1 and 2 showing, respectively, the airdam in its home position, an intermediate deflected position due to a wind force generated from a first motor vehicle speed $S_1$ and a fully deflected position due to a second wind force generated by a second motor vehicle speed $S_2$ were $S_2 > S_1$.
Figure 3B:
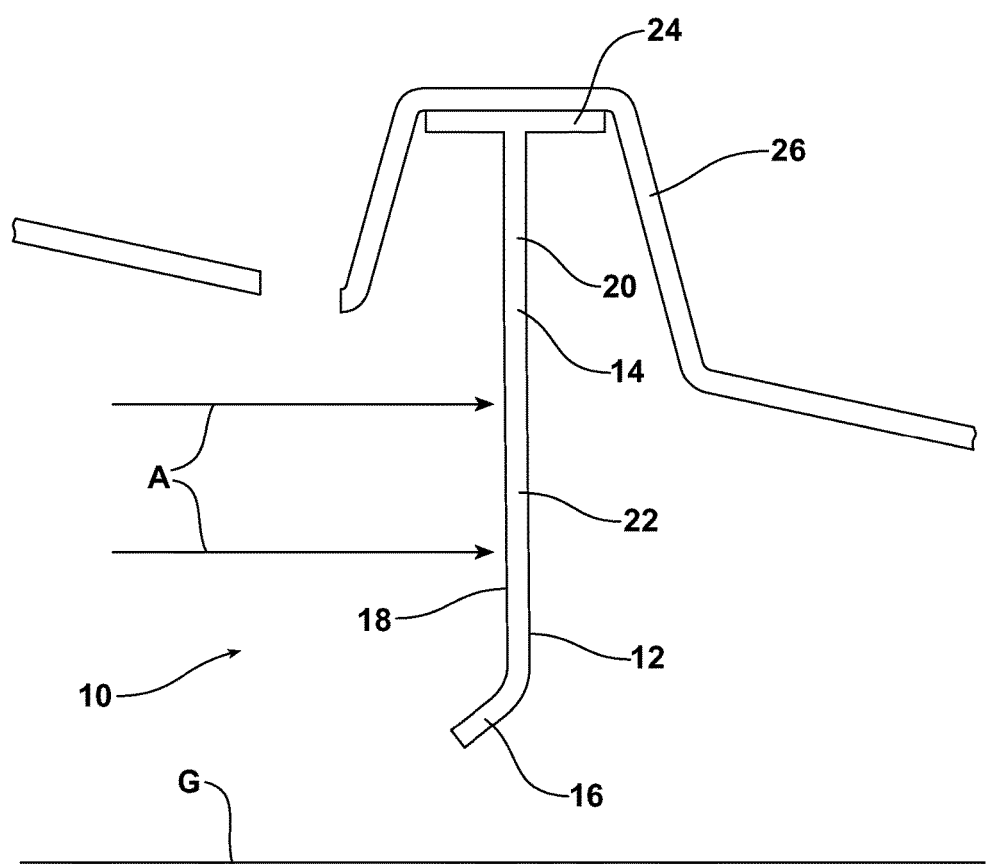
Figure 3C:
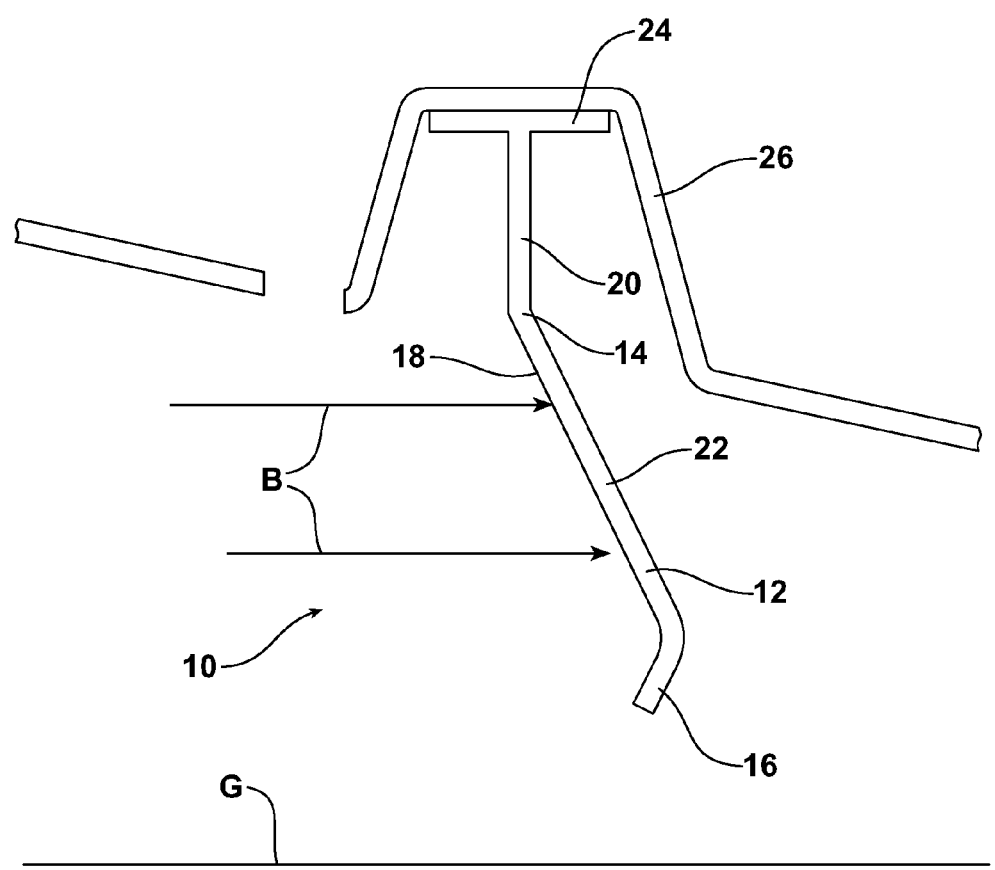

As should be appreciated, since the second or lower section 22 of the airdam 10 is made from a softer material, it will also deflect rearwardly when subjected to increasing wind force produced by increasing motor vehicle speed. Significantly, the airdam 10 has been designed to accommodate this deflection and still operate at utmost efficiency and effectiveness. Toward this end, the airdam 10 includes the forward tilt angle 14. At stop or at low speed, the airdam 10 assumes its home position as illustrated in FIG. 3a. As the speed of the motor vehicle increases, the force of the wind on the forward face 18 of the airdam 10 (note action arrows A) also increases causing the second or lower section 22 of the airdam to pivot about the transition zone between the first material of durometer $D_1$ and the second material durometer $D_2$ provided at the tilt angle apex 14 so as to assume an essentially vertical position. In this position, the airdam 10 extends a maximum length from the mounting base end 24 to the tip of the curved lip 16. In this position, the airdam 10 extends its maximum length toward the ground G providing its maximum effect in limiting the passage of air under the motor vehicle V (See FIG. 3b). As the speed of the vehicle increases further, the wind force (see action arrow B) acting on the forward face 18 of the airdam 10 continues to deflect the second or lower section 22 about the tilt angle apex 14 so as to be canted slightly rearwardly (See FIG. 3c). In this position, the second or lower section 22 has been deflected over center (past the vertical configuration illustrated in FIG. 3b). While the tip of the curved lip 16 does not extend downwardly as far vertically as it does in the FIG. 3b orientation, it should be appreciated that the effectiveness of the airdam in reducing lift and drag is maintained due to the forward angle of the curved lip 16. Further, the additional clearance provided between the lowermost tip of the curved lip 16 and the ground in this configuration functions to accommodate chassis lowering due to generated aerodynamic downforce and larger suspension travel that might be produced from roadway imperfections at these greater speeds.

Figure 4:
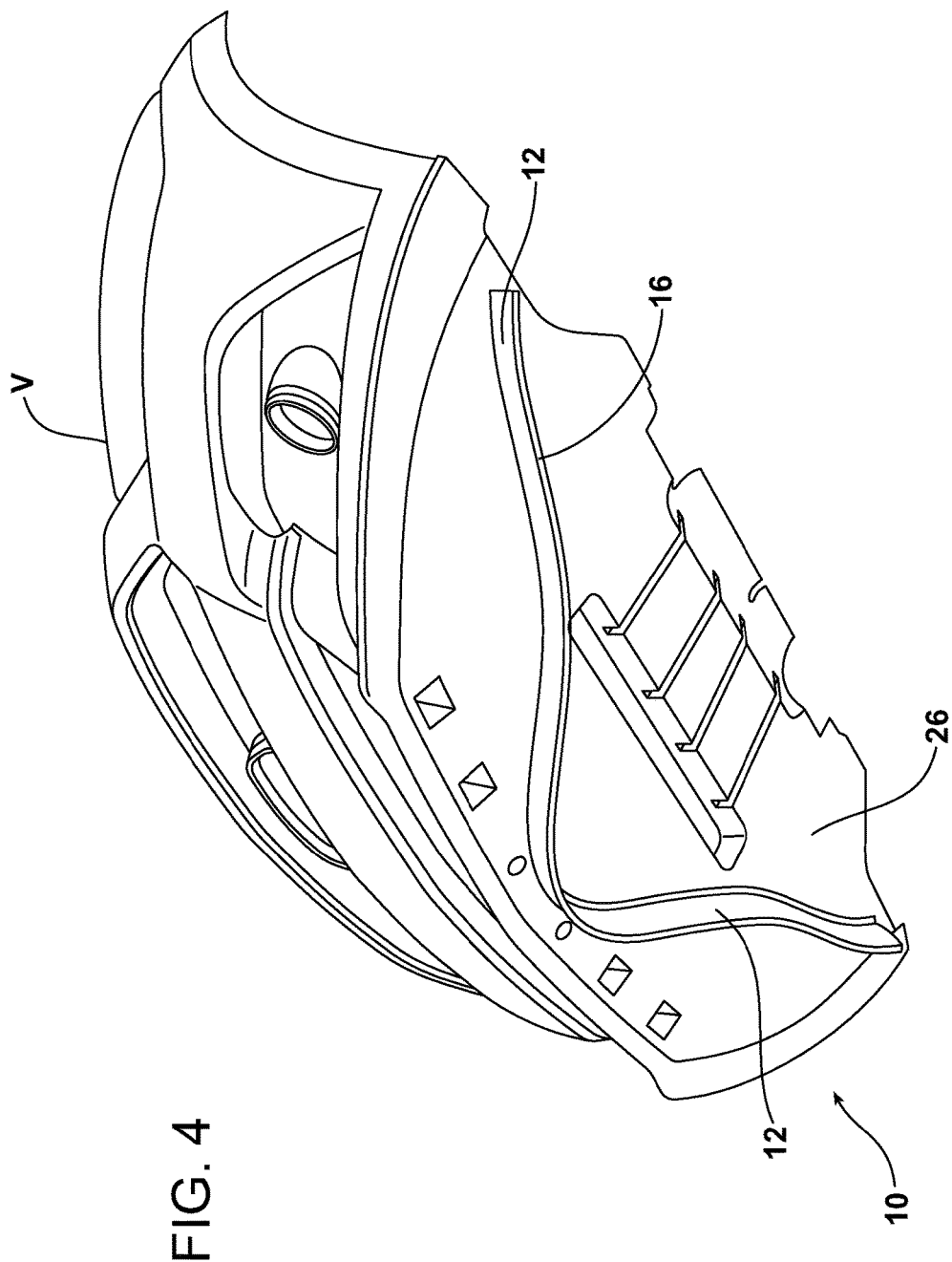
FIG. 4 is a perspective view from below of an alternative embodiment of the airdam incorporating a bell-curve shaped profile.
Figure 5:
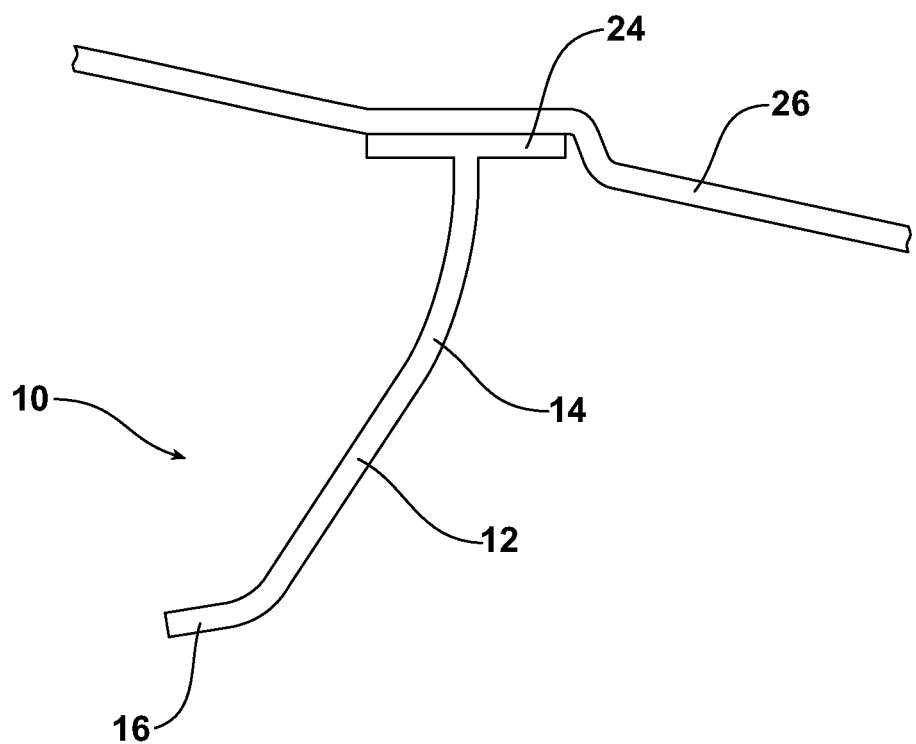
FIG. 5 is a cross-sectional view of the bell-curve shaped profile airdam illustrated in FIG. 4.

Reference is now made to FIGS. 4 and 5 illustrating yet another embodiment of the airdam 10. In this additional embodiment, the airdam 10 incorporates a bell curve shaped profile (see FIG. 4). The body 12 of the airdam 10, however, otherwise maintains a substantially J-shaped cross-section with a forward tilt angle of between 15° and 25° at the deflection apex as well as a forward curved lip 16. In any of the embodiments, it should be appreciated that the curved lip 16 functions to maintain the profile shape of the airdam whether that profile is a crescent shape as illustrated in the FIG. 1 embodiment or a bell curve shape as illustrated in the FIG. 4 embodiment.

In summary, numerous benefits are provided by the airdam 10. Since the airdam 10 is made by an extrusion process, it is relatively inexpensive to produce. The forward tilt angle 14 of the airdam 10 allows the airdam to be effective at higher speeds, by having the profile maintain its tallest height as the force of the wind contacting the forward face 18 increases. More specifically, the airdam 10 effectively takes the soft flexible property of the airdam into account. As illustrated in FIG. 2, in one possible embodiment, the airdam 10 incorporates a first or upper section 20 above the forward tilt angle apex 14 of relatively hard material and a second or lower section 22 below the forward tilt angle apex of relatively soft material. Advantageously this soft material will deflect upon contact with the ground or other object so as to prevent structural damage to the airdam 10. The curved lip 16 at the bottom of the airdam 10 functions to maintain the shape of the airdam 10 even after being deformed by wind forces at high speed or contact with the ground. As a result, the airdam is flexible and robust so as to avoid damage even after hard contact with approach angles, curbs, driveway ramps and the like.

The foregoing has been presented for purposes of illustration and description. It is not intended to be exhaustive or to limit the embodiments to the precise form disclosed. Obvious modifications and variations are possible in light of the above teachings. For example, while airdams 10 with a crescent shaped profile and bellcurve shaped profile are illustrated, it should be appreciated that other profiles may be provided. Further, while the illustrated embodiment includes the first or upper, stiffer section 20 perpendicular to the ground, it could be angled forward or backward up to perhaps 30° from the vertical. Thus, both the sections 20, 22 of the airdam 10 could be tilted forward and both could swing or pivot under wind load to varying degrees. All such modifications and variations are within the scope of the appended claims when interpreted in accordance with the breadth to which they are fairly, legally and equitably entitled.

What is claimed is:

1. An airdam for a motor vehicle, comprising:
an extruded body having a first section and a second section, said body further having a J-shaped cross-section defining a forward tilt angle and a curved tip, wherein said body is co-extruded with the first section of said body above said forward tilt angle made from a first material with a first durometer $D_1$ and the second section of said body below said forward tilt angle made from a second material with a second durometer $D_2$ where $D_1 > D_2$.

2. The airdam of claim 1, wherein said first material durometer $D_1$ is about 40 Shore D to about 65 Shore D and said second material durometer $D_2$ is about 55 Shore A to about 80 Shore A.

3. The airdam of claim 1, wherein said first material durometer $D_1$ is about 50 Shore D and said second material durometer $D_2$ is about 64 Shore A.

4. The airdam of claim 1, wherein said curved tip is curved forward.

5. The airdam of claim 1, wherein said body has a crescent shaped profile.

6. The airdam of claim 1, wherein said first section includes a mounting base.

7. The airdam of claim 1, wherein said forward tilt angle is between about 10 degrees and about 30 degrees.

8. The airdam of claim 7, wherein said curved tip is curved forward.

9. The airdam of claim 8, wherein said body has a bell curve shaped profile.

10. The airdam of claim 1, wherein said forward tilt angle is about 20 degrees.

11. The airdam of claim 10, wherein said curved tip is curved forward.

12. The airdam of claim 11, wherein said body has a bell curve shaped profile.

13. The airdam of claim 1, wherein said body has bell curve shaped profile.

14. An airdam for a motor vehicle, comprising:
an extruded body having a J-shaped cross-section defining a forward tilt angle and a curved tip, wherein said body is co-extruded with a first section of said body above said forward tilt angle made from a first material with a first durometer $D_1$ and a second section of said body below said forward tilt angle made from a second material with a second durometer $D_2$ where $D_1 > D_2$.

* * * * *